Oct. 6, 1931.  P. A. COOKE  1,825,994

GYROSCOPIC SYSTEM FOR CONTROLLING DIRIGIBLE CRAFT

Filed Aug. 18, 1930

Patented Oct. 6, 1931

1,825,994

UNITED STATES PATENT OFFICE

PHILIP ANDREW COOKE, OF SOUTH FARNBOROUGH, ENGLAND

GYROSCOPIC SYSTEM FOR CONTROLLING DIRIGIBLE CRAFT

Application filed August 18, 1930, Serial No. 476,099, and in Great Britain July 18, 1925.

This invention relates to automatic control systems for aeroplanes and like dirigible craft.

In the co-pending application of F. W. Meredith, Serial No. 476,107 filed, August 18, 1930, there is disclosed a control system wherein a single gyroscope controls both the rudders and the elevators of a craft to maintain the longitudinal axis of the craft extending in a predetermined direction relatively to the axis of spin of the rotor of the gyroscope. Owing to the rotation of the earth and friction in the bearings of the gyroscope, the rotor axis tends to precess. If this precession is persisted in, it will bring about a change in the trim of the craft and eventually result in the craft diving or stalling.

It is an object of this invention to provide means for countering such precessional errors of the gyroscope.

According to one feature of the invention, an automatic control system of the type referred to comprises a universally-mounted gyroscope having the rotor axis in the fore-and-aft direction of a craft, means sensitive to the component along a fore-and-aft axis fixed in the craft of the total acceleration of the craft, and means for applying torque determined by said component of acceleration to precess the rotor axis in the longitudinal vertical plane of the craft. The term "total acceleration" is intended to define the resultant of the acceleration of the craft relative to axes fixed in the earth and of the force per unit mass (hereinafter termed "gravitational acceleration") acting vertically upwards on the craft at rest relative to the same axes.

According to another feature of the invention, in an automatic control system of the type referred to, the azimuth ring is placed out of balance for the purpose of erecting the axis of spin of the rotor or countering precessional errors due to the earth's rotation or inherent tendency of the gyroscope to precess.

According to another feature of the invention, in an automatic control system of the type referred to, the azimuth gimbal ring is adapted so that backward tilt of the upper end of the axis of orientation of the azimuth ring precesses the forward end of the inner ring downwards or vice versa, to control the movement of the pitch ring.

According to another feature of the invention, in an automatic control system as described in any of the last three preceding paragraphs, spring-actuated means are provided for applying a torque to the azimuth ring to more or less balance the couple due to the component of gravitational acceleration normal to the azimuth ring for any desired angle of flight.

According to another feature of the invention, in an automatic control system as described in the last preceding paragraph, aneroid control means are provided for applying a torque to the azimuth ring to more or less balance the torque applied by the spring at any desired height.

According to another feature of the invention, in a control system comprising a single gyroscope for applying rudder angle and elevator angle, and having the azimuth ring unbalanced to counter precessional error as aforesaid, change of course is effected by applying a couple to the inner gimbal ring so as to precess the azimuth ring.

In the accompanying drawings.

Figure 1:
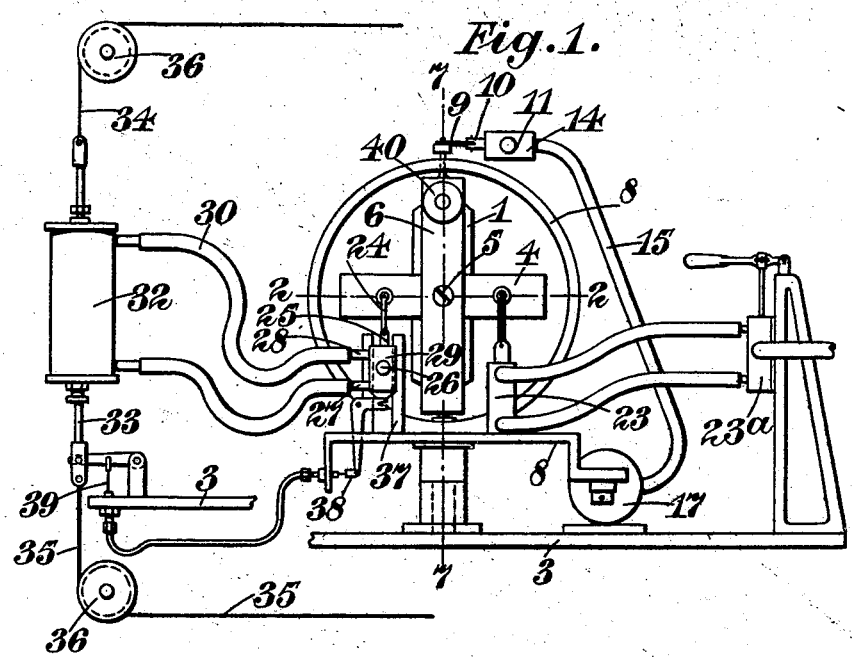
Figure 1 is an elevation.
Figure 2:
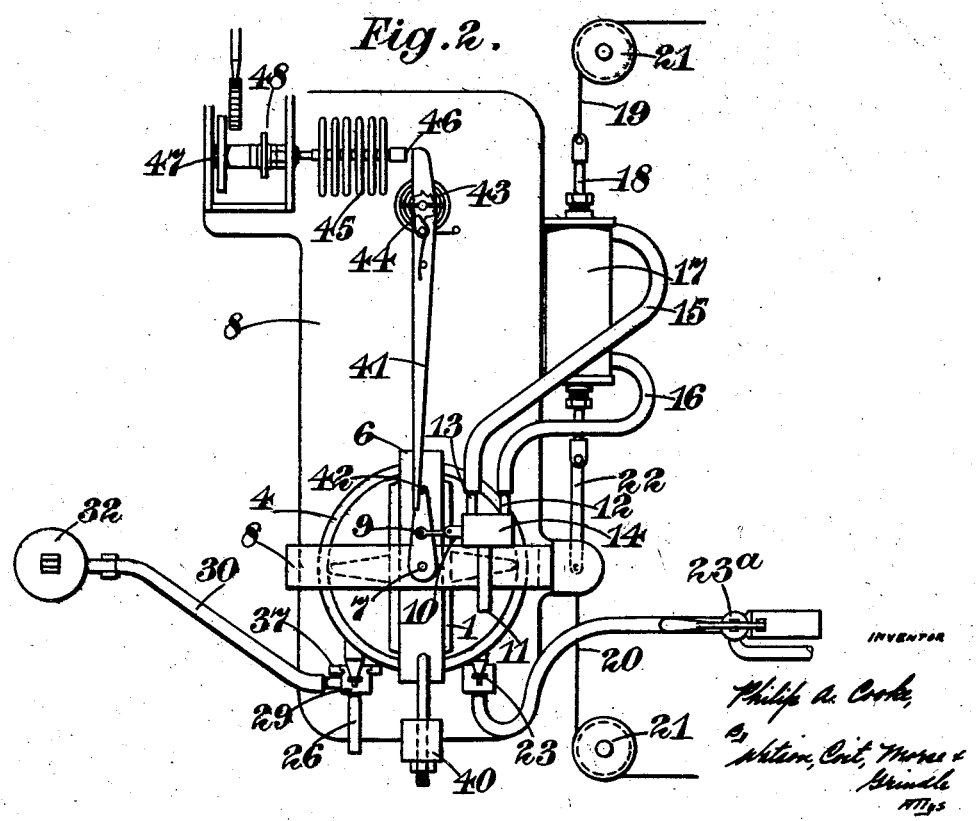
Figure 2 is a plan of a control system embodying a single gyroscope for applying rudder and elevator angle.

As shown, the gyroscope comprises a rotor 1 having its axis of spin 2—2 arranged in the fore-and-aft direction of the aeroplane 3 and mounted in an inner gimbal ring or pitch ring 4. The pitch ring 4 has its axis of tilt 5 arranged horizontally athwartship of the aeroplane and mounted in an outer gimbal ring or azimuth ring 6. The azimuth ring 6 has its axis of orientation 7 mounted in a frame 8. The rotor is air driven, and the supply for the driving jets is led through the hollow bottom pivots of the azimuth ring, to which the jets are attached.

For applying rudder angle, the azimuth ring is coupled by means of a link 9 to a sensitive balanced piston valve 10 controlling a compressed-air inlet port 11 and outlet ports 12, 13 in a casing 14 fast on the frame 8. The inlet and outlet ports communicate by flexible conduits 15, 16 with the respective ends of a servomotor cylinder 17 fast on the aeroplane, and the piston rod 18 of the servomotor is connected to the rudder control cables 19, 20 for operating the rudder. 21 are guide pulleys. Relative movement in azimuth between the azimuth ring and the frame admits air to the servomotor and applies rudder angle to correct deviations from course. In order to obtain a follow-up effect, in which the movement of the rudder is proportional or approximately so to the displacement of the azimuth ring, the frame 8 carrying the casing 14 is pivotally mounted on the aeroplane and is connected to the piston rod 18 by a link 22.

For changing course, a couple is applied to the pitch ring by means of a small air cylinder 23 fast on the frame 8 and containing a double-acting piston which is coupled by a link to the pitch ring. The admission of compressed air to either end of the cylinder at a time may be effected through a two-way valve 23a so as to apply a torque to the pitch ring and precess the outer gimbal ring in azimuth to apply rudder angle.

For elevator control, the pitch ring is coupled near its axis of tilt by means of a link 24 to a sensitive piston valve 25 controlling a compressed air inlet port 26 and outlet ports 27, 28 in a casing 29 slidably mounted on the frame 8. The inlet and outlet ports communicate by means of flexible conduits 30, 31 with the respective ends of a servomotor cylinder 32 fast on the aeroplane, and the piston rod 33 of this servomotor is connected to the elevator control cables 34, 35 for operating the elevators. 36 are guide pulleys. Relative movement between the pitch ring and the frame admits air to the servomotor and applies elevator angles. In order to obtain a follow-up effect in which the movement of the elevators is proportional or approximately so to the displacement of the pitch ring, the casing 29 is slidably mounted in vertical guides 37 on the frame 8 and is connected to the piston rod 33 by Bowden wire or the like mechanism 38, 39.

The apparatus so far described would control the aeroplane in azimuth and pitch, but precession of the inner or pitch ring, due to the rotation of the earth or inherent tendency of the gyroscope to precess would bring about a corresponding change of trim and if persisted in would lead to a stall or a dive.

To overcome this difficulty the whole rotor and gimbal system is deliberately put out of balance by a weight 40 on the azimuth ring so that in unaccelerated flight there will be no couple about the azimuth axis so long as this axis is vertical and under this condition the pitch ring is in equilibrium.

Any precession of the pitch ring is transmitted as described to the elevators and causes a change of attitude of the aeroplane. The azimuth axis, which is fixed in the aeroplane, is thereby tilted from the vertical, so that a component of the gravitational acceleration acting on the weight 40 exerts a couple round that axis, thus precessing the pitch ring back again and applying elevator until the azimuth axis is again vertical.

A lever 41 pivoted on the frame 8 is arranged at one end to bear on a pin 42 on the azimuth ring eccentric to the azimuth axis. The lever carries a coil spring 43 of the clock-spring type, which is so connected that its torque opposes the torque exerted by the weight 40 when the azimuth axis is inclined backward. A winding arrangement 44 allows the spring torque to be varied at will, hence the weight torque can be balanced and the pitch ring maintained in equilibrium for any desired angle of climb.

A stack of aneroid diaphragms 45 is mounted on the frame 8 so that when expanding it bears on the opposite end 46 of the lever 41 and opposes the spring torque.

In order that changes of height may be effected while the aeroplane is in flight, the anchorage of the aneroid diaphragms may be adjusted. One method of adjustment consists of anchoring the stack of diaphragms to the frame 8 by means of screw and nut gear 47, 48 which is driven by a small air motor, not shown.

In order to provide improved lateral stability, the rotor axis may be tilted as described in the co-pending application No. 476,107 aforesaid.

I claim:—

1. A gyroscopic control system for dirigible craft, moving in a fluid medium, comprising a single gyroscopic rotor, a universal mounting by which the rotor is supported to rotate normally about an axis fixed in the craft and extending in the direction of the length of the craft, a device for actuating the rudder of the craft, a device for actuating the elevator of the craft, controlling connections between said device and the rotor for bringing said devices into action as the result of, and in accordance with, a deviation of the rotor axis from said fixed axis, means for detecting acceleration of the craft in the direction of said fixed axis and torque-applying means operable under the control of the detecting means to apply a torque to the rotor to precess the rotor axis in the vertical plane containing said fixed axis.

2. A gyroscopic control system for dirigible craft moving in a fluid medium, comprising a single gyroscopic rotor, a universal mounting by which the rotor is supported to rotate normally about an axis fixed in the craft and extending in the direction of the length of the craft, a device for actuating the rudder of the craft, a device for actuating the elevator of the craft, controlling connections between said device and the rotor for bringing said devices into action as the result of, and in accordance with, a deviation of the rotor axis from said fixed axis, a lever for applying a torque to the rotor to precess the rotor axis in the longitudinal plane containing the said fixed axis and a weight operatively connected to the free end of said lever and mounted to move in the direction of said fixed axis whereby a torque proportional to the component of the total acceleration along said fixed axis will be applied to the rotor.

3. A gyroscopic control system for dirigible craft moving in a fluid medium, comprising a single gyroscopic rotor, two gimbal rings whereby the rotor is universally mounted to rotate about an axis fixed in the craft and extending in the direction of the length of the craft, and one of which is an azimuth ring, means for placing said azimuth ring out of balance, a device for actuating the rudder of the craft, a device for actuating the elevator of the craft, a controlling connection between the rotor and the first device for bringing the latter into action when the rotor deviates from said fixed axis in a substantially horizontal plane and a controlling connection between the rotor and the second device for bringing said device into action when the rotor deviates from said fixed axis in a substantially vertical plane.

4. A gyroscopic control system for dirigible craft moving in a fluid medium, comprising a single rotor, an inner gimbal ring wherein the rotor is mounted to turn about an axis fixed in the craft and extending in the direction of the length of the craft, an outer azimuth gimbal ring whereon the inner ring is mounted, a device for actuating the rudder of the craft, a controlling connection between said device and the azimuth ring by which said device is brought into action, a device for actuating the elevator of the craft, a controlling connection between said second device and the inner ring by which said second device is brought into action, and a weight applied to a part of the azimuth ring lying on that side of the longitudinal vertical plane of the craft towards which the upper part of the rotor is moving whereby, when the axis of orientation of the azimuth ring is tilted so that its upper end moves backwards, said weight will produce a couple to precess the forward part of the inner ring downwards.

5. A gyroscopic control system for dirigible craft moving in a fluid medium, comprising a single rotor, an inner gimbal ring wherein the rotor is mounted to turn about an axis fixed in the craft and extending in the direction of the length of the craft, an outer azimuth gimbal ring whereon the inner ring is mounted, a device for actuating the rudder of the craft, a controlling connection between said device and the azimuth ring by which said device is brought into action, a device for actuating the elevator of the craft, a controlling connection between said second device and the inner ring by which said second device is brought into action, a weight applied to a part of the azimuth ring lying on that side of the longitudinal vertical plane of the craft towards which the upper part of the rotor is moving whereby when the axis of orientation of the azimuth ring is tilted so that its upper end moves backwards, said weight will produce a couple to precess the forward part of the inner ring downwards, a spring anchored at one end and an operative connection between the free end of the spring and the azimuth ring to apply a couple thereto opposite to the couple produced by the weight when the axis of orientation is tilted as aforesaid.

6. A gyroscopic control system for dirigible craft moving in a fluid medium, comprising a single rotor, an inner gimbal ring wherein the rotor is mounted to turn about an axis fixed in the craft and extending in the direction of the length of the craft, an outer azimuth gimbal ring whereon the inner ring is mounted, a device for actuating the rudder of the craft, a controlling connection between said device and the azimuth ring by which said device is brought into action, a device for actuating the elevator of the craft, a controlling connection between said second device and the inner ring by which said second device is brought into action, a weight applied to a part of the azimuth ring lying on that side of the longitudinal vertical plane of the craft towards which the upper part of the rotor is moving whereby when the axis of orientation of the azimuth ring is tilted so that its upper end moves backwards, said weight will produce a couple to precess the forward part of the inner ring downwards, a spring anchored at one end, an operative connection between the free end of the spring and the azimuth ring to apply a couple thereto opposite to the couple produced by the weight when the axis of orientation is tilted as aforesaid, and means for varying the tension in said spring.

7. A gyroscopic control system for dirigible craft moving in a fluid medium, comprising a single rotor, an inner gimbal ring whereon the rotor is mounted to turn about an axis fixed in the craft and extending in the direction of the length of the craft, an outer azimuth gimbal ring whereon the inner ring is mounted, a device for actuating the rudder of the craft, a controlling connection between said device and the azimuth ring by which said device is brought into action, a device for actuating the elevator of the craft, a controlling connection between said second device and the inner ring by which said second device is brought into action, a weight applied to a part of the azimuth ring lying on that side of the longitudinal vertical plane of the craft towards which the upper part of the rotor is moved whereby when the axis of orientation of the azimuth ring is tilted so that its upper end moves backwards, said weight will produce a couple to precess the forward part of the inner ring downwards, a spring anchored at one end, an operative connection between the free end of the spring and the azimuth ring to apply a couple thereto opposite to the couple produced by the weight when the axis of orientation is tilted as aforesaid, a barometric device, and a lost-motion connection between said barometric device and the free end of the spring through which the barometric device takes the load of the spring.

8. A gyroscopic control system for dirigible craft moving in a fluid medium, comprising a single rotor, an inner gimbal ring wherein the rotor is mounted to turn about an axis fixed in the craft and extending in the direction of the length of the craft, an outer azimuth gimbal ring whereon the inner ring is mounted, a device for actuating the rudder of the craft, a controlling connection between said device and the azimuth ring by which said device is brought into action, a device for actuating the elevator of the craft, a controlling connection between said second device and the inner ring by which said second device is brought into action, a weight applied to a part of the azimuth ring lying on that side of the longitudinal vertical plane of the craft towards which the upper part of the rotor is moving whereby when the axis of orientation of the azimuth ring is tilted so that its upper end moves backwards said weight will produce a couple to precess the forward part of the inner ring downwards, a spring anchored at one end, an operative connection between the free end of the spring and the azimuth ring to apply a couple thereto opposite to the couple produced by the weight when the axis of orientation is tilted as aforesaid, a barometric device, a lost motion connection between said barometric device and the free end of the spring and adjustable means for varying the amount of lost motion afforded by the lost-motion connection.

9. A gyroscopic control system for dirigible craft moving in a fluid medium comprising a rotor, an inner ring on which the rotor is mounted to turn normally about an axis fixed in the craft and extending in the direction of the length of the craft, an azimuth ring whereon the inner ring is mounted to turn about an axis extending transversely of the craft, a mounting whereon the outer ring is mounted to turn about a vertical axis, a relay device for actuating the rudder of the craft, a connection between said relay device and the azimuth ring, a second relay device for actuating the elevator of the craft, a connection between said second relay device and the inner ring and a torque applying member operatively connected to the inner ring and arranged for operation under the control of the pilot of the craft.

10. A gyroscopic control system for dirigible craft moving in a fluid medium comprising a rotor, an inner ring on which the rotor is mounted to turn normally about an axis fixed in the craft and extending in the direction of the length of the craft, an unbalanced azimuth ring whereon the inner ring is mounted to turn about an axis extending transversely of the craft, a mounting whereon the azimuth ring is mounted to turn about a vertical axis and to be unbalanced about said axis but to be in equilibrium when said axis is vertical, a relay device for actuating the rudder of the craft, a connection between said relay device and the azimuth ring, a second relay device for actuating the elevator of the craft, a connection between said second relay device and the inner ring, and a torque-applying member operatively connected to the inner ring and arranged for operation under the control of the pilot of the craft.

11. A gyroscopic control system for dirigible craft moving in a fluid medium, comprising a single balanced rotor, a balanced inner gimbal ring whereon the rotor is mounted to spin about an axis extending in the direction of the length of the craft, an unbalanced outer gimbal ring whereon the inner ring is mounted to turn about an axis extending transversely of the craft, a mounting whereon the outer ring is mounted so as to turn about, and to be unbalanced with respect to, and axis substantially at right-angles to the aforesaid two axes, but to be in equilibrium with respect to gravitational forces when said third axis is vertical, a relay device for actuating the elevator of the craft and a controlling connection between said relay device and the inner gimal ring.

12. A gyroscopic control system for dirigible craft moving in a fluid medium comprising a rotor, an inner ring on which the rotor is mounted to turn normally about an axis fixed in the craft and extending in the direction of the length of the craft, an azimuth ring whereon the inner ring is mounted to turn about an axis extending transversely of the craft, a mounting whereon the outer ring is mounted to turn about a vertical axis, a relay device for actuating the rudder of the craft, a connection between said relay device and the azimuth ring, and a torque applying member operatively connected to the inner ring and arranged for operation under the control of the pilot of the craft.

13. A gyroscopic control system for dirigible craft moving in a fluid medium comprising a rotor, an inner ring on which the rotor is mounted to spin about an axis extending in the direction of the length of the craft, an outer ring on which the inner ring is mounted to turn about a transverse axis, a frame on which the outer ring is mounted to turn about an erect axis, a rudder-actuating member, a servo-motor for moving said member to actuate the rudder, a differential control device for controlling said rudder operatable under the joint control of the outer ring and the rudder-actuating member, and a servo-motor for applying torque to the inner ring about its axis of turning.

14. A gyroscopic control system for dirigible craft moving in a fluid medium comprising a rotor, an inner ring on which the rotor is mounted to spin about an axis extending in the direction of the length of the craft, an outer ring on which the inner ring is mounted to turn about a transverse axis, a frame on which the outer ring is mounted to turn about an erect axis, an accelerometer for measuring acceleration in the direction of the length of the craft, a member by which the reaction of the accelerometer is applied to the outer ring at a point remote from its axis of turning, a rudder-actuating member, a servo-motor for moving said member to actuate the rudder, a differential control device for controlling said rudder operatable under the joint control of the outer ring and the rudder-actuating member, and a servo-motor for applying torque to the inner ring about its axis of turning.

In testimony whereof I have signed my name to this specification.

PHILIP ANDREW COOKE.